United States Patent Office 2,761,575
Patented Sept. 4, 1956

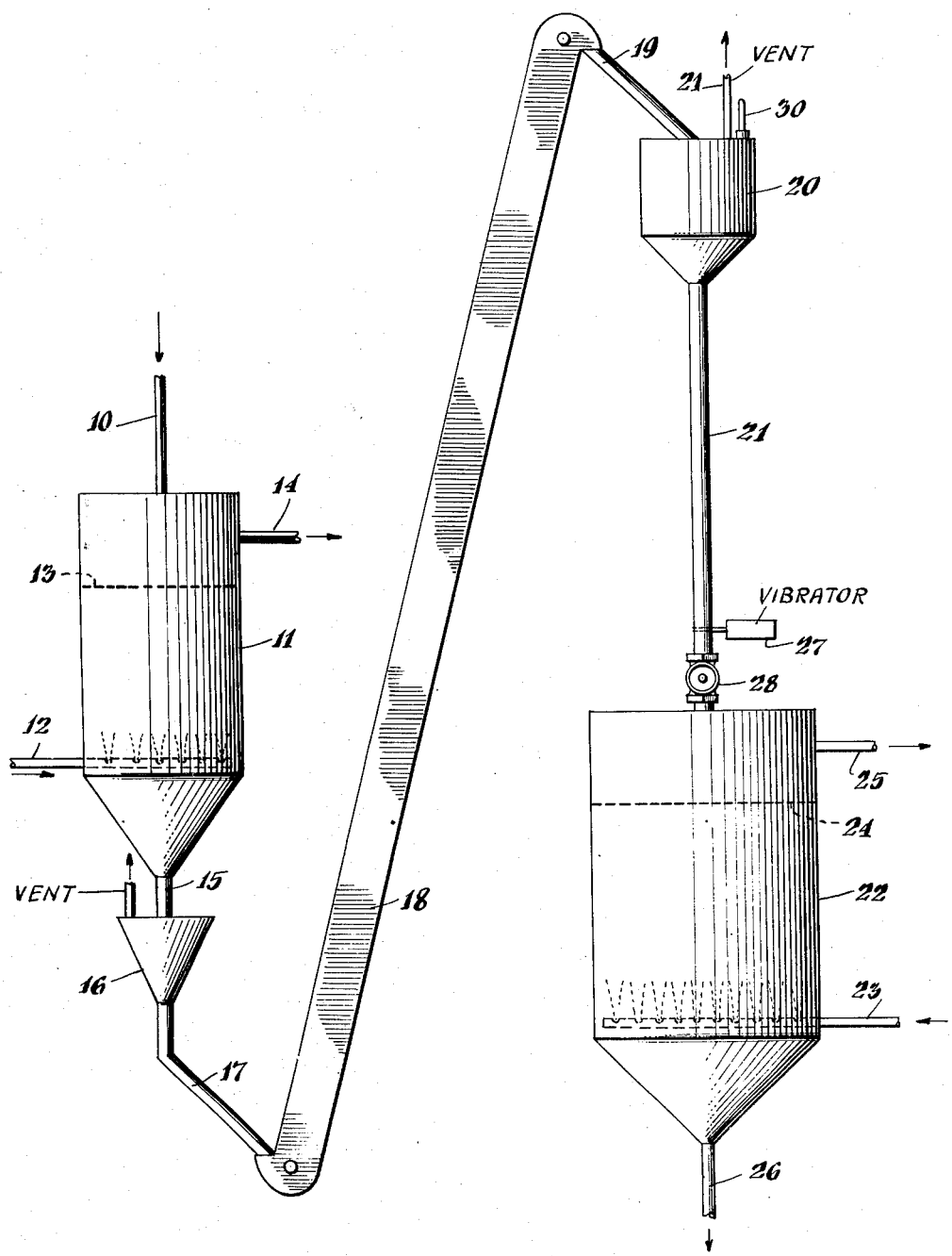

2,761,575

METHOD OF TRANSPORTING POWDER INTO ADVANCED PRESSURE ZONE

George J. Visconty, Woodstown, N. J., assignor to Socony Mobil Oil Company, Inc., a corporation of New York Application February 1, 1952, Serial No. 269,543

3 Claims. (Cl. 214—152)

This invention is directed to an improved method of continuously transporting a solid contact powder into an advanced pressure region in a petroleum process. It is particularly adapted for the continuous introduction of spent contact adsorbent powder from a lube oil filtration process into an advanced pressure regeneration zone.

A variety of processes are available in the refining of petroleum products which utilize solid powdery material, either as a heat carrier or as a catalyst to improve or effect the chemical reactions. Typical of such processes which give rise to a spent contact material bearing oily or tarry deposits is the filtration or percolation of petroleum oils through particle-form adsorbents for the purpose of removing color bodies and gum forming contituents. Such a process may be conducted at ordinary atmospheric temperatures giving rise to a spent adsorbent containing varying amounts of carbonaceous contaminants. Another hydrocarbon contact process, typical in this art, is the catalytic conversion of hydrocarbons, it being well known that when hydrocarbons boiling in the range of 400–850° F. are contacted with suitable adsorbent type catalysts at pressure generally above atmospheric and at temperatures of the order of 800° F. and upwards, the hydrocarbons may be converted to gasoline and gas, resulting in the deposit of carbonaceous contaminants on the catalyst. Other typical hyrocarbon conversion processes are the catalytic treating, reforming, hydrogenation, dehydrogenation, polymerization, desulfurization or alkylation of relatively low boiling hydrocarbons.

Although the invention has broad application to the types of hydrocarbon conversion processes above mentioned, it finds preferred application in a recently developed contact filtration process. In this process catalyst fines, of a particle size smaller than about 40 mesh Tyler and were usually less than 150 mesh, are contacted with the liquid oil to effect the removal of color bodies and gummy constituents. Spent fines are continuously removed from the process and subjected to a solvent bath, naphtha being preferred as the solvent medium. A substantial portion of the contaminants on the fines are removed by the naphtha in this manner. The wet fines are then passed through a filter to effect the removal of the bulk of the naphtha and then introduced, in partially dried form, into a suspension drier. The fines are kept in ebullient form in the drier by the upward flow of a hot gas, such as superheated steam.

The dried fines are removed from the bottom of the drier containing a small percentage of residual contaminant material which must be removed by burning. The contaminants are removed in a kiln by passing a combustion supporting gas upwardly through the kiln at a rate sufficient to violently agitate the contact particles therein and effect their removal by burning. The combustion is preferably carried on under pressure as a continuous process.

The object of this invention is to provide a simple method of introducing fines, removed from the drier, continuously into the kiln without the interposition of locks or ports.

This and other objects will be made more apparent by the following description in conjunction with the attached sketch.

The figure shows a diagrammatic view of a suspension drier and kiln with connecting means for transferring fines from the bottom of the drier to the top of the kiln.

Partially dried fines from the filter press are introduced through the conduit 10 into the top of the drier 11. Superheated steam is introduced through the conduit 12 into the bottom of the drier 11 to effect the suspension of the fines and the formation of a substantially horizontal simulated liquid level, shown by dotted line 13. The steam and naphtha are removed from the top of the vessel through the conduit 14 and transferred to suitable separating apparatus to effect the removal and recovery of the naphtha from the water and occluded fines.

The bulk of fines is removed from the vessel through the conduit 15 to a depressurizing chamber 16. The fines are then carried through conduit 17 to an upwardly moving conveyor 18, such as a bucket elevator. The fines are discharged from the top of the conveyor through the conduit 19 into a hopper 20, which is vented to atmosphere through the conduit 21. The fines are gravitated downwardly through the elongated conduit 21 into the top of the kiln 22.

A combustion supporting gas, such as air, is introduced into the bottom of the kiln 22 through the conduit 23 in sufficient amount to violently agitate the bed of contact material and effect a suspension of the solids with a simulated liquid level 24. The gas is withdrawn above this level through the conduit 25 to exhaust. The contaminants are burned from the contact material in the kiln, the temperature being maintained at about 900–1200° F. Regenerated contact material is removed from the bottom of the kiln 22 continuously through the conduit 26 for reuse in the contact filtration process. It is found desirable to operate the kiln under advanced pressure, for example 5–50#/in.$^2$ gauge, and, therefore, the conduit 21 must be at least long enough to prevent the escape of gas through the substantially compacted column of contact material therein.

Although the compacted column of contact material in the conduit 21 provides adequate seal for the prevention of the escape of gas from the vessel 22, there is a problem in effecting the smooth transfer of such small particle-size material downwardly through an elongated passage of restricted cross-section. It has been found that this can be met to some extent by vibrating the column, thereby preventing the particles from bridging the column. It has been found that this can be done most effectively by vibrating the conduit 21 at its base, just above the vessel 22. The vibrations are also found to be most effective in a lateral direction, or transverse to the direction of flow of the contact material.

Although the contact material can be made to flow through the elongated conduit against advanced pressure in the kiln, when the conduit is under suitable vibration, the flow is not satisfactory for a continuous process. The flow rate is found to be highly erratic and unpredictable. Using a glass tube as a flow column, it was found that bridging of the contact material in the column occurred when the column was not vibrated, causing the flow through the column to be stopped or materially reduced. Using small diameter columns, this occurred even though the receiving vessel was maintained at atmospheric pressure. When the conduit was vibrated, the fines flowed through the conduit but broke away from continuous contact to form an agitated suspension in an unpredictable manner. The flow rate under these conditions fluctuated widely. The behavior of the unrestricted vibrated column was found to be so erratic that such a device was unsuitable for feeding finely divided solids from a low to a high pressure zone.

It was found, however, that if the lower end of the column were restricted just sufficient to maintain a continuous column of substantially compacted contact material in the conduit 21, by means of restriction 28, the material flowed through the conduit smoothly and in a uniform manner. This proved to be an effective manner for introducing the fines into the kiln against an advanced pressure, and as long as the column was vibrated the flow was smooth and regular. The compacted column provided an effective seal leg, thereby preventing the escape of vapors from the high pressure vessel. This method of transfer can be used to move solids between vessels at the same pressure and in that instance, the compacted column of particles serves as a seal to prevent vapor transfer between the vessels.

*Example*

A two inch O. D. glass pipe was used as a feed leg to feed catalyst fines (98% through 100 mesh Tyler) into a pressure drum. The pipe length was four feet and the frequency of vibration used was 7,300 cycles per minute. The glass column was partially filled with dark catalyst fines and vibrated until the solids settled. A pound of clean fines was poured into the column and the column again vibrated until no further settling occurred. The length of the clean bed column was then measured, its volume calculated and the density determined. A mark was then placed on the glass tube below the interface between the dark and light fines. The valve at the bottom of the column was opened and when the interface reached the mark, a second mark was made on the column at the level of the top of the white column. The distance between the two marks was measured and the flowing density determined. Fines were added to the column in pound units of alternately light then dark colored particles and the valve at the bottom of the column was throttled to maintain the length of the light or dark sections not substantially greater than the length of these sections when the valve was closed. The settled density in these tests was 41 lbs./cu. ft. and the flowing density in each case was between about 41–43 lbs./cu. ft. The following results were obtained:

| Run No. | Flow Rate #/M in. | Press. Diff., In. of Hg |
| --- | --- | --- |
| 1A | 0.92 | 0 |
| 1B | 0.90 | 0 |
| 1C | 0.92 | 0 |
| Avg | 0.91 | 0 |
| 2A | 0.89 | 0.3 |
| 2B | 0.87 | 0.3 |
| 2C | 0.93 | 0.3 |
| Avg | 0.89 | 0.3 |
| 3A | 0.63 | 0.6 |
| 3B | 0.66 | 0.6 |
| 3C | 0.67 | 0.6 |
| Avg | 0.65 | 0.6 |
| 4A | 0.77 | 0.9 |
| 4B | 0.55 | 0.9 |
| 4C | 0.69 | 0.9 |
| 4D | 0.53 | 0.9 |
| 4E | 0.65 | 0.9 |
| Avg | 0.64 | 0.9 |

In commercial practice, a "bull's-eye" can be incorporated into the feed leg so that the gravitating column can be visually observed. The inspection opening is located so that the observer looks in a downward and lateral direction to observe the column of solids. The opening can be so positioned that substantially none of the particles escape through the opening. The flow rate through the feed leg is controlled in response to the visual observation of the column, so as to maintain the particles in substantially compact columnar form. It is also feasible to calibrate any particular pipe and determine the flow rate which should be maintained through the pipe to maintain the particles passing through it in substantially compacted form. The flow rate is then measured during operation of the system in which this pipe is used as a feed leg and the flow is throttled to maintain the previously determined desirable flow rate.

Although it is possible to locate the vibrator at any point along the length of the feed leg, and to locate the throttling valve above the bottom of the pipe, in the preferred form of the invention the valve is located at the bottom of the pipe and the vibrator is located just above the valve. The frequency of vibration used may range from about 3,000 cycles per minute to as many as 9,000 cycles per minute. The preferred frequency range is about 5,000–9,000 cycles per minute. The throttling means may be adjustable, such as a gate or plug valve, or may be a device having several selectable orifices or may be a fixed throttle, such as a fixed orifice, venturi or restriction near the lower end of the pipe.

The examples cited hereinabove are included only for purpose of illustration of the invention and are not intended as limiting the scope of the invention. The only limitations intended are those found in the appended claims.

I claim:

1. The method of continuously introducing a solid adsorbent contact powder of a particle size smaller than 40 mesh into an enclosed advanced pressure zone which comprises continuously: discharging the powder from a storage zone at low pressure into the top of an elongated laterally confined substantially unobstructed passage, passing the powder downwardly through the passage in the form of a substantially compact column to the advanced pressure zone, the length of the column being sufficient to prevent the escape of any substantial quantity of gas from the advanced pressure zone, subjecting the column to automatic high frequency vibration sufficiently to improve the flow characteristics of the powder, throttling the flow of the column near the bottom thereof sufficiently to retain the contact powder in substantially compacted form, and passing the material from the bottom of the column into the advanced pressure zone.

2. The method of continuously introducing a solid adsorbent contact powder of a particle size smaller than 40 mesh into an enclosed advanced pressure zone which comprises continuously: discharging the powder from a storage zone at low pressure into the top of an elongated laterally confined substantially unobstructed passage, passing the powder downwardly through the passage in the form of a substantially compact column to the advanced pressure zone, the length of the column being sufficient to prevent the escape of any substantial quantity of gas from the advanced pressure zone, subjecting the base of the column to automatic high frequency vibration sufficiently to improve the flow characteristics of the powder, throttling the flow of the column near the bottom thereof sufficiently to retain the contact powder in substantially compacted form, and passing the material from the bottom of the column into the advanced pressure zone.

3. The method of continuously introducing a solid adsorbent contact powder of a particle size smaller than 40 mesh into an enclosed advanced pressure zone which comprises continuously: discharging the powder from a storage zone at atmospheric pressure into the top of an elongated substantially vertical and substantially unobstructed passage of restricted cross-section, passing the powder downwardly through the passage in the form of a substantially compact column to the advanced pressure zone, the length of the column being sufficient to prevent the escape of any substantial quantity of gas from the advanced pressure zone, subjecting the base of the column to lateral vibration sufficiently to improve the flow characteristics of the powder and with a frequency of about 3,000 to 9,000 cycles per minute, throttling the flow of the column near the bottom thereof sufficiently to retain the contact powder in substantially compacted form, and passing the material from the bottom of the column into the advanced pressure zone.

References Cited in the file of this patent

UNITED STATES PATENTS

| | | |
|---|---|---|
| 1,512,223 | Hitchcock | Oct. 21, 1924 |
| 2,304,827 | Jewell | Dec. 15, 1942 |
| 2,613,832 | Ogorzaly et al. | Oct. 14, 1952 |